Aug. 21, 1934.    R. V. GRAYSON ET AL    1,970,746
INSULATION UNIT
Filed Nov. 11, 1931    2 Sheets-Sheet 1
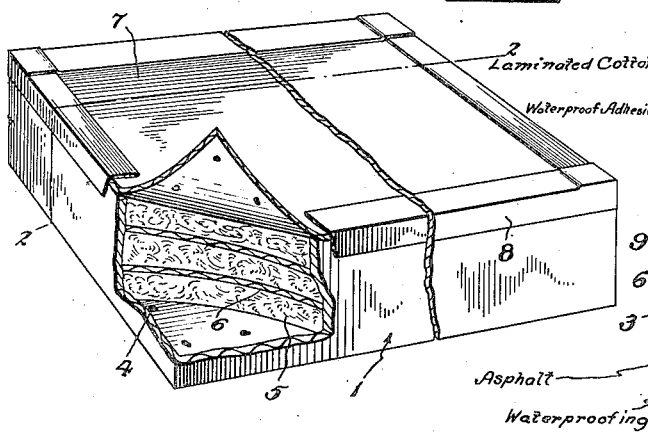
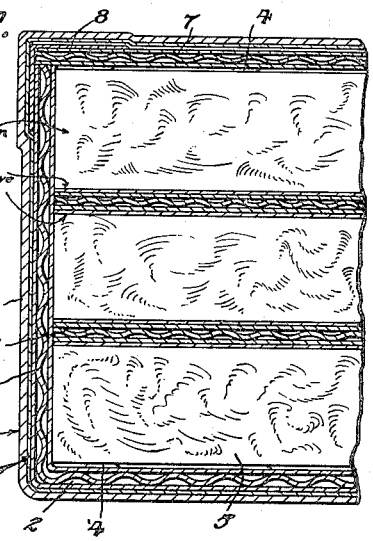
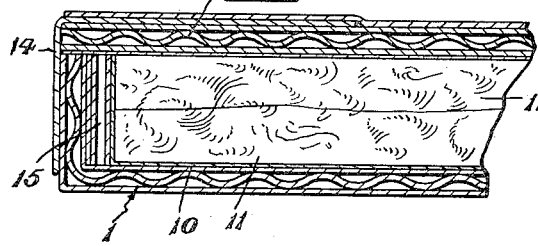
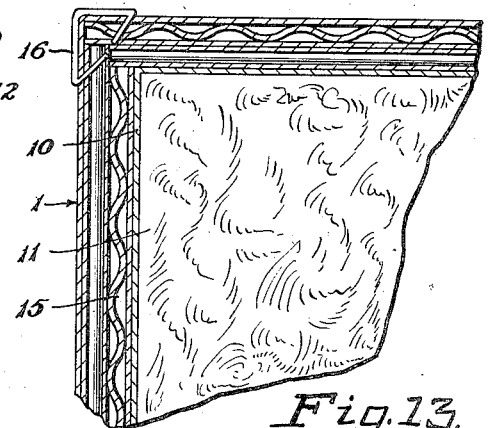
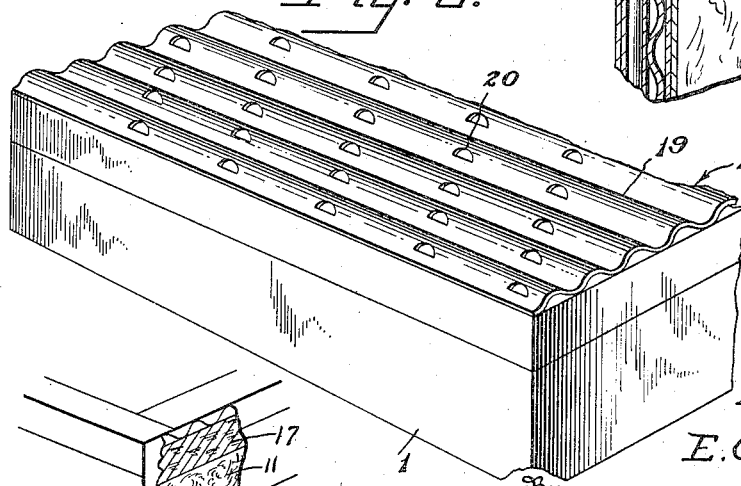
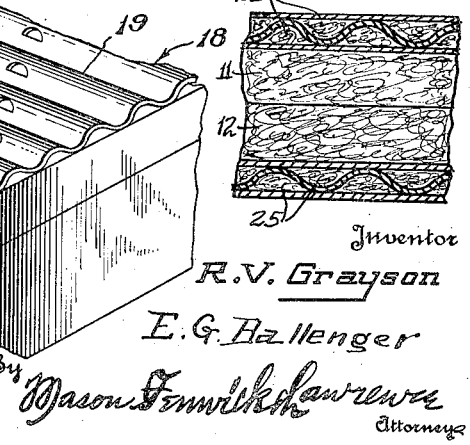
Inventor
R. V. Grayson
E. G. Ballenger
By Mason Fenwick Lawrence
Attorneys Aug. 21, 1934.  R. V. GRAYSON ET AL  1,970,746
INSULATION UNIT
Filed Nov. 11, 1931  2 Sheets-Sheet 2
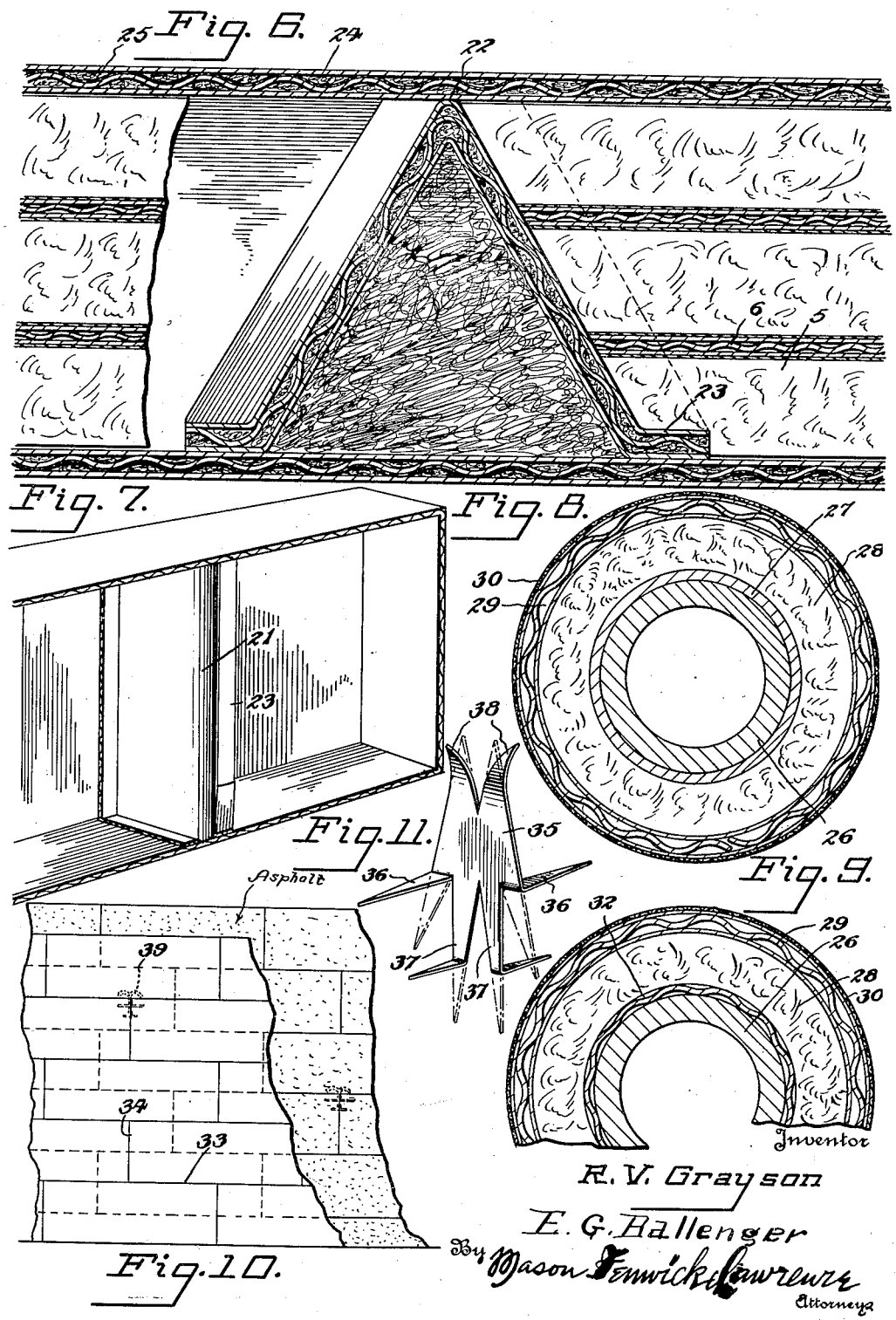

Patented Aug. 21, 1934

1,970,746

UNITED STATES PATENT OFFICE 1,970,746

INSULATION UNIT

Ralph V. Grayson and Edgar G. Ballenger, Atlanta, Ga.; said Grayson assignor to Patent and Security Holding Corporation, Tampa, Fla., a corporation of Florida Application November 11, 1931, Serial No. 574,443

4 Claims. (Cl. 154—45)

This invention relates to the art of heat or cold conservation, and it has for its object the construction of novel and efficient insulation media particularly designed for the walls of refrigerators, freezing chambers, refrigerated storage rooms, or for shipping-receptacles in which foods or other products in frozen state are transported. The invention is as well adapted as a wall lining or material, for houses or rooms, or as a lagging for pipes and boilers, or in any other relation where it may be desirable to retard the transmission of heat.

Among the more specific objects of the invention is the construction of an insulation unit in which a cotton core, alone or in combination with other insulating constituents, is enclosed in a cellular shape-sustaining casing which may be dimensioned to form panels as for a refrigerator casing, cylindrical or semi-cylindrical sections for encasing pipes or other cylindrical vessels, or in units of uniform and standard sizes and shapes, designed to be fabricated into any desired wall construction.

A further object of the invention is to provide a water-proof and fire-resistant insulation unit of the type above described.

Among the more specific objects of the invention is the provision of a unit composed of layers of fibrous material fire-proofed, arranged in alternation with layers of sheet cellular material, strata of water-proofing intervening, the whole being encased in a suitable light, heat insulating, fire-resistant casing, hermetically sealed and immersed in a water-proof coating material.

Other objects of the invention will appear as the following description of a preferred and practical embodiment thereof proceeds.

In the drawings which accompany the following specification forming a part thereof, and in which the same characters of reference have been employed throughout the several figures to denote identical parts:

Figure 1 is a perspective view of a container embodying the principles of the present invention, part being broken away to disclose details of construction;

Figure 2 is a section taken along the line 2—2 of Figure 1;

Figure 3 is a simplified modification of the application shown in cross section;

Figure 4 is a fragmentary sectional view taken at right angles to the section shown in Figure 3;

Figure 5 is a perspective view illustrating a third form of the invention in which the insulation unit may be like that shown in Figs. 1 or 3, but being provided on one surface with a corrugated plaster base;

Figure 6 is a transverse section through a modified form of the invention showing an intermediate supporting strut;

Figure 7 is a vertical perspective of the same modification, the frame only being shown, the core being removed;

Figures 8 and 9 are cross sectional views showing respectively, modified forms of the invention adapted for surrounding hot and cold pipes;

Figure 10 is a vertical elevation, part being broken away showing a wall construction made of units embodying the principles of the invention;

Figure 11 is a perspective view of the uniting clip for joining units in the wall construction;

Figure 12 is a fragmentary detail in perspective showing the use of a layer of comminuted cork in conjunction with a layer of cotton, as the composite core material; and Figure 13 is a detail in perspective showing the corrugated casing with the cells filled with cotton.

Referring now in detail to the several figures and first adverting to that form of the invention illustrated in Figures 1 and 2, a casing or container 1 is provided, the bottom and sides of which are formed of corrugated fiber board as indicated, respectively, at 2 and 3 in Figure 2. The bottom of this container is preferably spotted at intervals with glue or other suitable adhesive 4, and then a layer 5 of cotton is spread upon the bottom of said container in adhesive relation to the glue. A thin sheet of craft board or any other suitable cellular sheet 6 is then placed upon the aforesaid layer of cotton. The upper and lower surfaces of this sheet have preferably been coated with an adhesive waterproof composition. A second layer of cotton is laid upon the first sheet of craft board and then another layer of cotton is put in place, another layer of craft board, and so on in alternation until the desired thickness of the core has been attained. In the present instance three layers of cotton are shown between which are interleaved two layers of the craft board treated as stated on opposite sides with the waterproof adhesive. The cotton layers have preferably, previous to their insertion, been impregnated with a fire-proofing compound and then dried. A flat sheet 7 of corrugated board, fitting the container as a lid and spotted with glue on its underside, is then placed upon the topmost layer of cotton and the meeting edges of the lid and container are suitably sealed with a paper binding 8 or sealed in any other suitable manner. The unit now comprises an inseparable structure comprising a core of alternate layers of cotton and corrugated fiber board united to the top and bottom of the cellular casing or container.

The casing is then immersed or otherwise suitably coated with asphalt or any other desired water-proofing material, the same being indicated at 9 in Fig. 2. If desired, previous to the external application of the asphalt, the sealed container may be water-proofed by being brushed over with any suitable water-proofing liquid.

Since the asphalt is apt under certain conditions to remain tacky, it may be desirable to coat the inside instead of the outside of the container or casing with asphalt in the manner shown in connection with Figures 3 and 4. In this instance, the spots 4 of glue will be required, since the cotton would stick to the asphalt.

In that form of the invention shown in Figure 3 the container or casing 1 is formed of corrugated board, the inside being provided with a water-proofing layer 10 of asphalt. Layers 11 and 12 of cotton are placed in this container, the number of layers depending upon the depth of the container. In this form of the invention, the interleaved layers of corrugated board have been omitted. The cotton is however, preferably suitably fire-proofed. A lid 13 of corrugated board is placed upon the container, the lid being coated on its underside with asphalt. The lid and container are sealed together by a suitable adhesive tape 14 and if desired the entire casing or container may be treated with a coat of water-proofing.

In this form of the invention, the insulation efficiency of the unit may be enhanced by providing an inner peripheral lining 15 of corrugated board, the corrugations running perpendicularly to the corrugations in the outer side wall of the container. Thus a double number of air cells are provided between the exterior of the container and the edges of the cotton laminations. The paper sealing strip 14 may be relied upon to hold together the corners of the casing or container, but if desired the corners may be secured by means such as the staple 16.

Figure 12 shows that if desired, one of the layers of cotton 11 may be substituted by a layer 17 of comminuted cork. This cork may be in loose state or if desired, it may be compressed into a block or sheet.

In building a wall of the units described in connection with Figures 1 and 3, it may be desired to plaster either the inside or outside surface of the wall. The insulation unit may therefore be adapted for this purpose by providing it with a plaster base 18, see Figure 5. This plaster base may consist of a corrugated member 19 adhesively applied to one of the surfaces of the unit, and having the corrugations transversely punched or otherwise formed with perforations 20. The corrugated member is designed to receive a layer of plaster, keys of which enter the perforations 20 anchoring the plaster in place.

Where insulation units of large area but of relatively small thickness are built into a wall, there is a chance of these units sagging or warping in the middle. This may be avoided by a construction such as is shown in Figures 6 and 7 in which the container 1 is provided adjacent its middle with a strut 21. This strut is preferably of triangular cross section and may be constructed of light cellular material such as the same corrugated board of which the container itself is made.

The altitude of the triangular strut is preferably equal to the width of the unit as shown in Figure 6 in which the apex 22 touches one wall of the casing, while the free edges 23 of the strut are bent into flat engagement with the opposite wall. Said edges are preferably suitably pasted to the casing and the apex 22 may also be adhesively engaged to the opposite wall if desired. The core consisting in this instance of alternate layers 5 of cotton and 6 of corrugated board are fitted into the container before the lid 24 is applied. The ends of said layers are preferably arranged in close relation to the sides of the strut 21 and the triangular space within the strut may also be filled with cotton. In this and the other forms of the invention, the corrugated board if desired, may include in its construction a filler 25 of cotton, the provision of which naturally increases the insulating efficiency of the unit, see also Figure 13.

In Figures 8 and 9 forms of the invention are illustrated adapting the insulation unit to lagging for a pipe. The pipe is designated at 26. In Figure 8 the pipe is presumed to be hot and the inner wall 27 of the casing is preferably of asbestos sheeting. This is surrounded by a layer 28 of the fire-proofed cotton, the outer wall of the casing comprising a sheath 29 of corrugated board. For convenience in installing, this insulation unit is, as is customary, divided into longitudinal halves, and held assembled together when on the pipe by a muslin covering 30 lapping the joint 31 between the halves and being adhesively applied.

In Figure 9, the pipe 26 is presumed to carry a refrigerant. Consequently, the asbestos lamination is substituted by an inner wall 32 of corrugated board which directly engages the surface of the pipe. The other features of the unit shown in connection with Figure 9 are identical with those illustrated in connection with Figure 8.

Figure 10 shows a double walled construction fabricated of individual units which may be like those shown in Figures 1, 3 or 6. Preferably only the adjacent contacting faces of these units are coated with asphalt, the same functioning as a binder. It will be observed that the back layer is started at a higher level than the front layer so as to stagger the horizontal joints 33 and that the vertical joints 34 are staggered as in ordinary brick laying. Securing clips are employed for binding the wall into an integral whole. One of these clips is illustrated in Figure 11 which shows that it is a flat metallic blank 35 cut out to form points, four of which 36 and 37 radiate downwardly while another pair, 38 is directed upwardly. The downwardly directed points are bent in pairs in opposite directions as shown and the clip functions by being placed between two units in a row which units are pressed against it so as to cause the points 36 and 37 to penetrate the adjacent walls of said units. The upper points 38 may be initially very slightly deflected in opposite directions. The overlying unit is pressed down upon the points causing them to penetrate its lower wall, and since said points are deformable, they spread as is indicated at 39 in Figure 10, riveting the upper unit to the adjacent underlying units in the lower row.

It is obvious that while we have illustrated the insulation unit of the present invention as comprising a casing constructed of corrugated fiber board, it will be understood that other suitable shape-sustaining materials may be used for the casing, such for instance as light wood, and since the laminated core in itself possesses unusual heat insulating qualities, the casing may even be made of metal without serious depreciation in the insulation value of the unit.

It will also be understood that the specific details of construction and arrangement of parts as herein disclosed are by way of example and not to be construed as limiting the scope of the invention as claimed.

What we claim is:

1. Insulation unit comprising a casing of corrugated board having a laminated peripheral wall composed of a plurality of layers of corrugated board with the corrugations of adjacent layers disposed at an angle of substantially 90 degrees and a core of laminated cotton fiber sealed within said casing.

2. Insulation unit comprising a cellular casing of parallelepipedal shape having a relatively small thickness dimension, a cellular strut at an intermediate part within said casing bridging the width thereof and contacting the opposite faces bounded by the length and breadth dimensions of said casing, and a laminated core of insulation substance sealed within said casing.

3. Insulation unit comprising a cellular casing of parallelepipedal shape having a relatively small thickness dimension, a cellular strut at an intermediate part within said casing bridging the width thereof, contacting the opposite faces bounded by the length and breadth dimensions of said casing and adhesively bonded to said casing, and laminated core of insulation material sealed within said casing.

4. Insulation unit comprising a cellular casing of parallelepipedal shape formed of corrugated fiber board and having a relatively small thickness dimension, a strut of corrugated board and triangular cross section within an intermediate part of said casing, bridging the width thereof and adhesively contacting the opposite faces bounded by the length and breadth dimensions of said casing, and a laminated core of insulation material sealed within said casing and closely contacting the sides of said strut.

RALPH V. GRAYSON.
EDGAR G. BALLENGER.